C. W. FISH.
CULTIVATOR.
APPLICATION FILED AUG. 25, 1919.
1,325,149.
Patented Dec. 16, 1919.
2 SHEETS—SHEET 1.
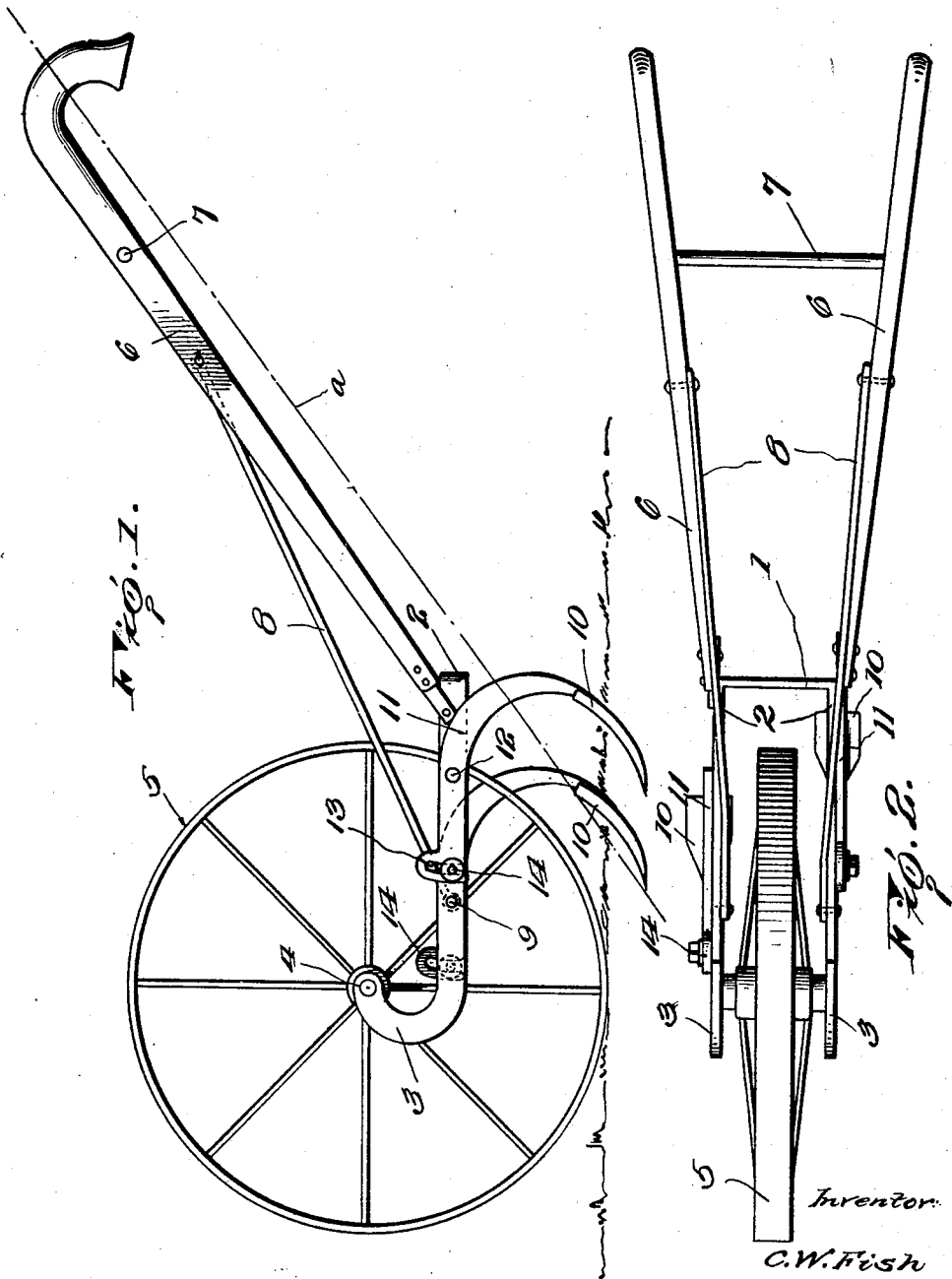
Inventor
C. W. Fish
by Lacey & Lacey,
Attys.

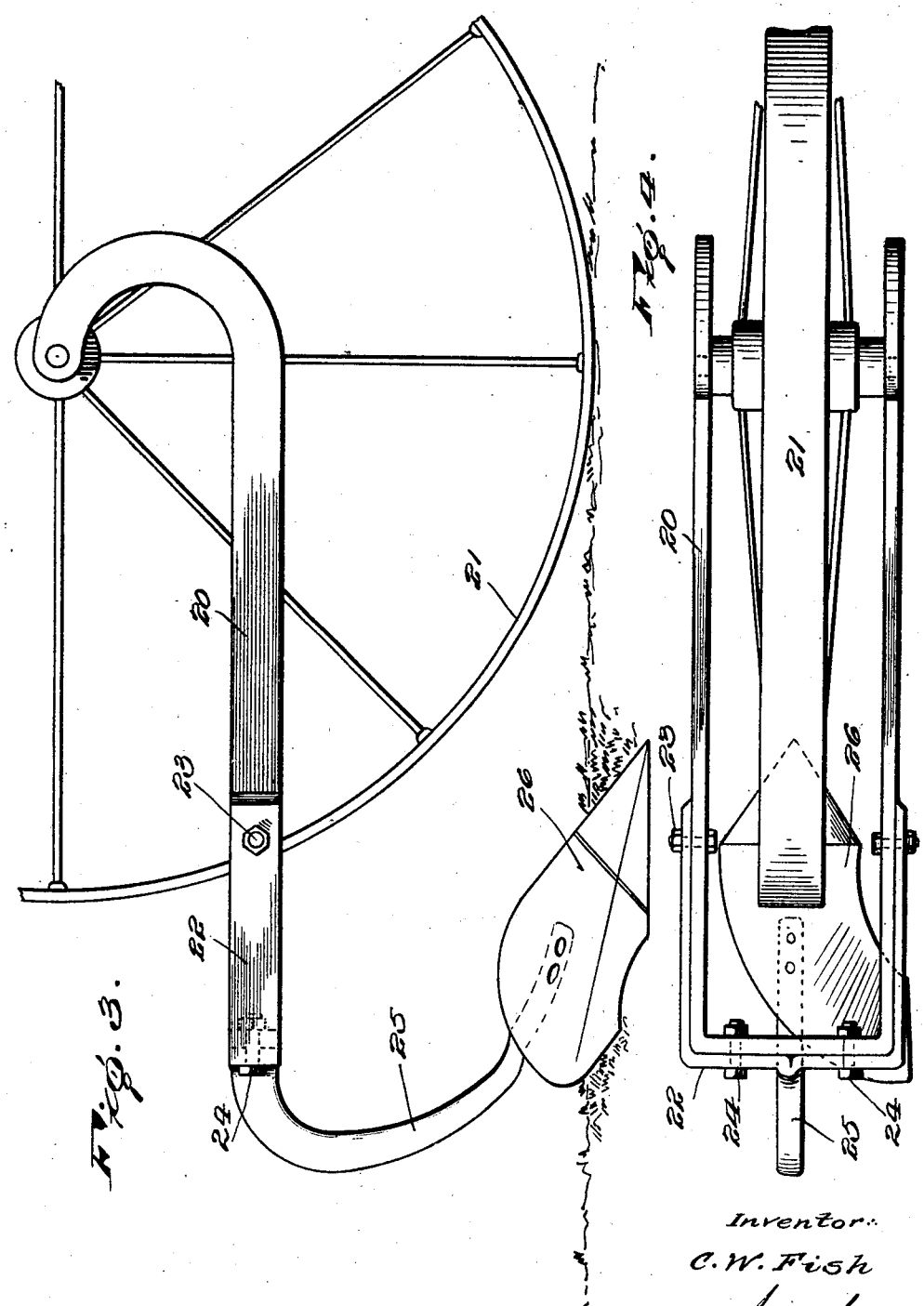

UNITED STATES PATENT OFFICE.

CLARENCE W. FISH, OF CLIMBING HILL, IOWA.

CULTIVATOR.

1,325,149.  Specification of Letters Patent.  Patented Dec. 16, 1919.

Application filed August 25, 1919. Serial No. 319,584.

*To all whom it may concern:*

Be it known that I, CLARENCE W. FISH, a citizen of the United States, residing at Climbing Hill, in the county of Woodbury and State of Iowa, have invented certain new and useful Improvements in Cultivators, of which the following is a specification.

This invention relates to cultivators and has for its object the provision of a light hand-propelled implement which may be easily forced through the ground and in which the parts will be so disposed that the propelling force will be applied to the ground-engaging members and effect an uplifting loosening action on the soil. The invention seeks to provide an implement for the stated purpose which will be composed of few parts, simple in their construction and readily accessible for adjustment or repairing.

The invention is illustrated in the accompanying drawings, in which—

Figure 1 is a side elevation of a cultivator embodying my improvements;

Fig. 2 is a plan view of the same;

Fig. 3 is a side elevation of a different embodiment of the invention;

Fig. 4 is a plan view of the implement shown in Fig. 3.

In carrying out the invention, I employ a frame consisting of an end member 1 and side bars 2 extending forwardly from said end member in parallel relation and having their front ends 3 curved upwardly and rearwardly, as clearly shown in Fig. 1. In the terminals of said upturned portions, I fit an axle 4 carrying a ground wheel 5 which may be of any well-known form. To the side bars 2 at the rear ends thereof, I secure the handles 6 which will be connected by a brace 7 in the usual manner, and extend upwardly and rearwardly from the frame. A brace 8 is connected to each handle and has its front end secured to the adjacent side bar 2, as shown at 9, so that a rigid structure is provided. The plow blades or shovels 10 may be of any preferred type and are carried by beams 11 having their rear ends curved downwardly, as clearly shown, and pivotally attached to the side bars, as at 12, intermediate their ends. The front ends of the beams are provided with arcuate slots 13 through which fastening bolts 14 are inserted into the respectively adjacent side bars so that the beams may be pivotally adjusted and the depth of the shovels or plow blades below the frame regulated.

Upon reference to Fig. 1 of the drawings, it will be noted that the force applied to the handles 6 and through them to the implement will be exerted along the line $a$ passing from the grips of the handles to the point of the forward plow and will not be applied to the wheel 5 which, consequently, acts merely as a support for the front end of the frame and serves as a fulcrum about which the frame may swing. It will be particularly noted that the upturned curved front ends of the frame dispose the frame below the axle of the wheel and the form and proportions of the several parts are such that the plows are brought into engagement with the ground at points between the vertical planes of the axle 4 and the rearmost point of the periphery of the wheel and the under draft on the frame will tend to hold the plows in the ground. In using garden plows or cultivators of the hand-propelled type, the operator imparts a forward plunging motion to the implement as he takes each step, pulling the plow slightly backward before each forward step and plunge. With other implements, the forward plunging movement has a digging, scratching, or tearing effect on the soil but my implement has a hoeing, uplifting action which loosens the soil in a manner to promote growth of vegetation.

In the form of the invention shown in Figs. 1 and 2 and previously described, two plows are employed, one being disposed somewhat in advance of the other. It may, however, be sometimes preferred to use a single plow running directly in the plane of the wheel and to this end I provide the arrangement shown in Figs. 3 and 4 in which the frame 20 is of the same structure and form as the frame previously described and has a wheel 21 mounted in its front end in the same manner as the wheel 5 is mounted. A supplemental U-shaped frame 22 is employed of such dimensions that it may fit close to and around the rear end of the frame 20 and be rigidly bolted thereto, as shown at 23 and 24. A standard 25 is secured to or formed integral with the rear end member of the frame 22 and extends downwardly and forwardly therefrom in a curve, as clearly shown in Fig. 3, and to the lower forward end of this standard is secured a plow share or shovel 26 which may be of any desired or well-known form and is illustrated as provided with a mold board to throw the dirt to one side. The handles will be secured to the frame 20 in exactly the same manner as the handles 6 are secured in the first described form of the invention and the draft will be applied and utilized in exactly the same way.

Having thus described the invention, what is claimed as new is:

1. A cultivator comprising a frame having the front ends of its side bars turned upwardly and rearwardly, a wheel fitted between the said upturned ends of the frame, a ground-engaging member supported from the said frame, and handles secured to said frame at the rear end thereof and extending upwardly and rearwardly therefrom in such a position that the force applied to the handles will be exerted along a line passing through the ground-engaging member.

2. A cultivator comprising a frame having its front ends extending upwardly and rearwardly so as to overhang the main portion of the frame, a supporting wheel carried by said ends of the frame, a ground-engaging member, a curved standard extending downwardly and then forwardly from the frame and supporting the ground-engaging members, handles secured to the frame at the rear end thereof and extending upwardly and rearwardly therefrom, and braces secured at their rear ends to said handles and at their front end to the frame in rear of the front ends of the same.

3. A cultivator comprising a frame consisting of a rear end member and side bars extending forwardly from said end member, the front ends of the side bars being curved upwardly and rearwardly to overhang the said bars, a wheel carried by the overhanging terminals of said ends, a rearwardly downwardly and forwardly curved support secured to and depending from the frame, a ground-engaging member carried by said support, and handles secured to the rear end of the frame and extending upwardly and rearwardly therefrom whereby force applied to said handles will be exerted through the ground-engaging member.

In testimony whereof I affix my signature.

CLARENCE W. FISH. [L. S.]